Figure 7:
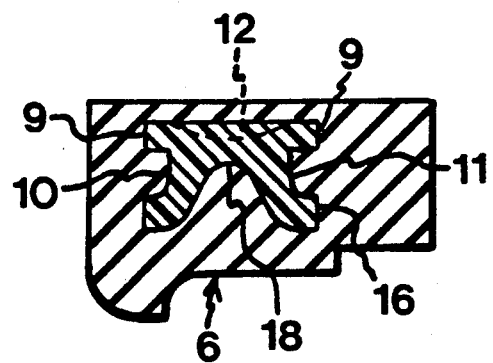

United States Patent [19]

Tuunanen

[11] Patent Number: 5,137,092

[45] Date of Patent: Aug. 11, 1992

[54] HORSESHOE

[76] Inventor: Arne Tuunanen, Sallerupsvägen 6, S-212 18 Malmö, Sweden

[21] Appl. No.: 624,044

[22] Filed: Dec. 7, 1990

Related U.S. Application Data

[63] Continuation-in-part of Ser. No. 263,777, Dec. 5, 1988, Pat. No. 4,993,494.

[30] Foreign Application Priority Data

Apr. 18, 1986 [SE] Sweden .................... 8601777

[51] Int. Cl.$^5$ ................................ A01L 5/00
[52] U.S. Cl. .................... 168/4; 168/DIG. 1
[58] Field of Search ................. 168/4, 12, 13, DIG. 1

[56] References Cited

U.S. PATENT DOCUMENTS

| | | | |
|---|---|---|---|
| 922,408 | 5/1909 | Fawkes | 168/4 |
| 1,151,797 | 8/1915 | Kent | 168/13 |
| 2,085,347 | 6/1937 | Wachter | 168/13 |

FOREIGN PATENT DOCUMENTS

| | | | |
|---|---|---|---|
| 308309 | 3/1989 | European Pat. Off. | 168/4 |
| 2308228 | 10/1974 | Fed. Rep. of Germany | 168/4 |
| 393427 | 6/1933 | United Kingdom | 168/4 |

*Primary Examiner*—Robert P. Swiatek
*Attorney, Agent, or Firm*—Barnes, Kisselle, Raisch, Choate, Whittemore & Hulbert

[57] ABSTRACT

A horseshoe conformed substantially to the U-shaped sole of the hoof and comprising a portion of an elastic friction material and a reinforcing insert of a flexible material, wherein the insert is narrower than the width of the U-shaped sole such that thrust, shock and shear loads are elastically absorbed by the portion. The portion comprises an upwardly open cavity which extends in the longitudinal direction of the portion and in which a separate element of a curable composite material is positioned, the composite material being caused to cure in situ only after the insert has been given its final shape.

6 Claims, 3 Drawing Sheets

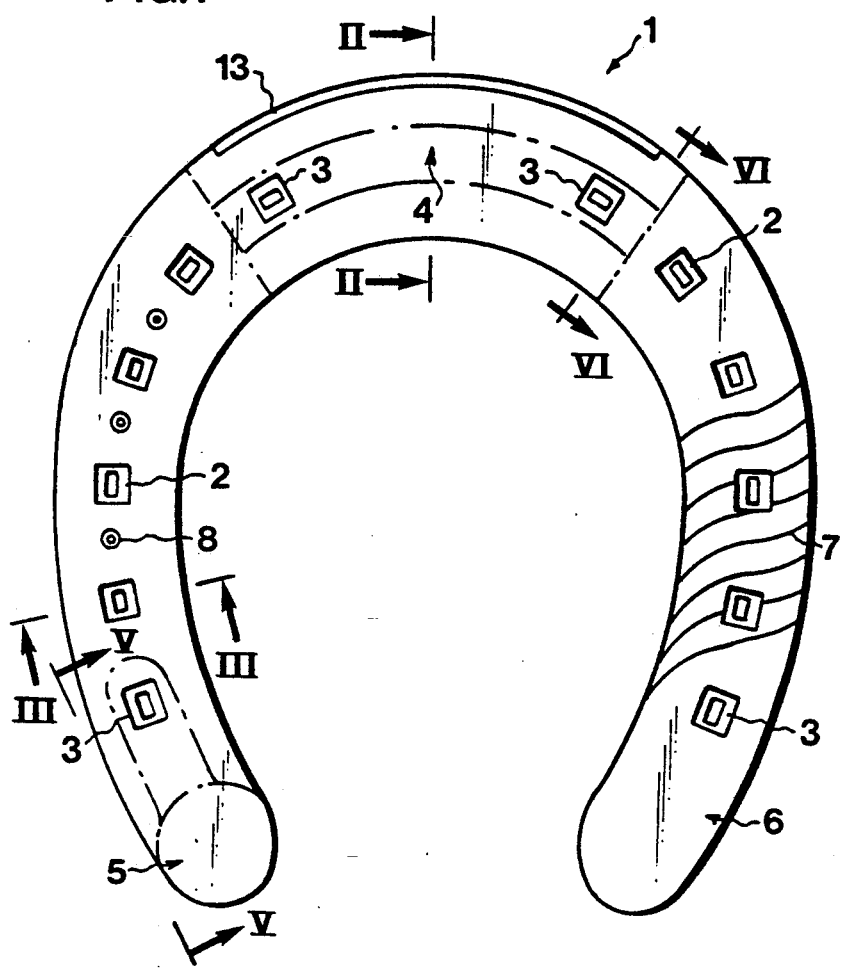

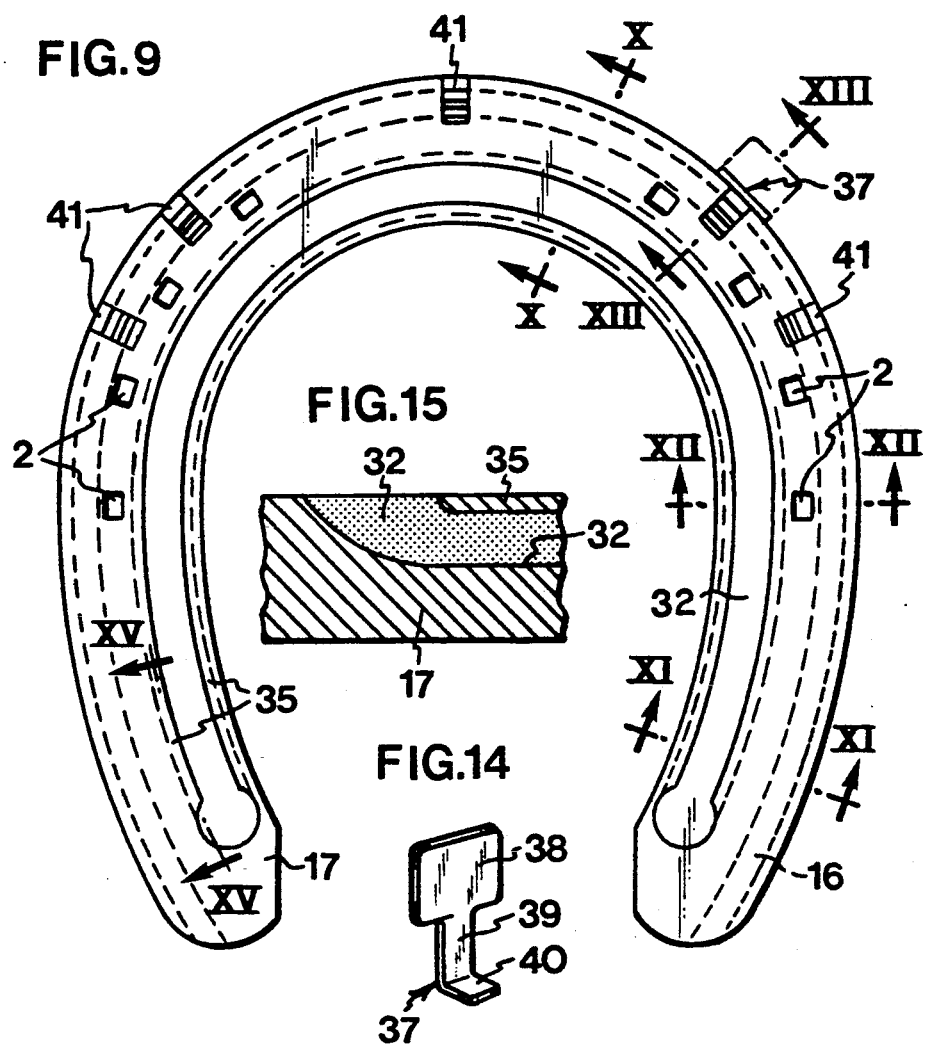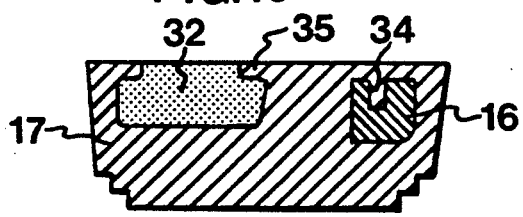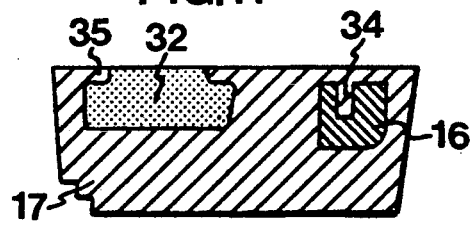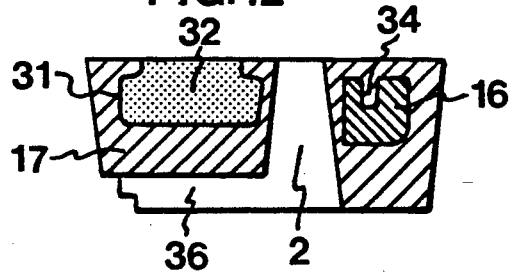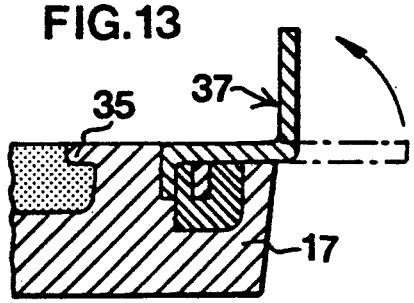

HORSESHOE

This is a continuation in part of U.S. application Ser. No. 263,777 filed on Oct. 17, 1988, now U.S. Pat. No. 4,993,494.

The present invention relates to a horseshoe conformed substantially to the U-shaped sole of the hoof and having a reinforcing insert of a flexible material and a portion which encloses the insert and is made of an elastic friction material.

Prior art horseshoes mainly aim at providing better friction to various substrates and making the shoe lighter. It has also been endeavoured to provide a non-skid shoe, see for example DE Offenlegungsschrift 3,219,091 or DE Offenlegungsschrift 2,604,607. The main problem is, however, the fixation of the nails for attaching the shoe. When the horse is moving, the nails waggle concurrently with the deformation of the elastic material and eventually break owing to fatigue. Also various types of metal insert have been tried but, because of the shape of the insert, the hammer used for adjusting and attaching the shoes has created fissures in the material surrounding the insert.

The main object of the horseshoe according to the invention is to reduce the risk of injuries to the horse as a consequence of its slipping in stables or on hard roadways and to provide the horse with a permanent soft support which resembles the natural sole. Since slipping on hard concrete or asphalt substrates frequently causes sprained muscles or fractures which heal very slowly or, perhaps, never at all, such a shoe has long been keenly desired, especially by turf people.

A further object of the horseshoe according to the invention is to reduce the risk of fire in stables with concrete floors, where conventional metal horseshoes easily generate sparks when the horse paws the floor.

Another object of the horseshoe according to the invention is to reduce the risk of self-inflicted injuries to the horse, such as when the horse is galloping or trotting and strikes one foot against the other. Also the risk of injuries which grazing horses cause each other by kicking, can be reduced by means of this shoe.

A still further object is to provide a horseshoe which is easily formable by hand and which comprises an insert which, when the nails for fixing the shoe are driven into the hoof, safely guides and fixes the nails in the shoe. This is achieved in that the nail guides taper, and in that the shoe surface engaging the hoof is also covered by an elastic material to prevent the shoe from sliding on the hoof. Furthermore, the shoe can be more easily attached as compared with presentday shoes and may in special cases, e.g. for cross-country racing, also be glued to the rear parts of the hoof, the so-called quarters.

To achieve these objects, the horseshoe according to the invention is characterised in that the insert is narrower than the width of the U-shaped sole of the hoof such that thrust, shock and shear loads are elastically absorbed by the portion enclosing the insert.

The shoe according to the invention reduces the risk of slipping in stables and on concrete or asphalt type substrates, and at the same time the horse is given a permanent soft support which resembles the natural sole and is easy on the joints. The reduced risk of slipping also means less risk of sprained muscles and other injuries. The fact that the shoe according to the invention is much softer than conventional shoes also reduces the risk of injuries due to trampling. The shoe can also be more easily attached to the hoof than conventional metal shoes, mainly because it is easier to adjust.

Figure 8:
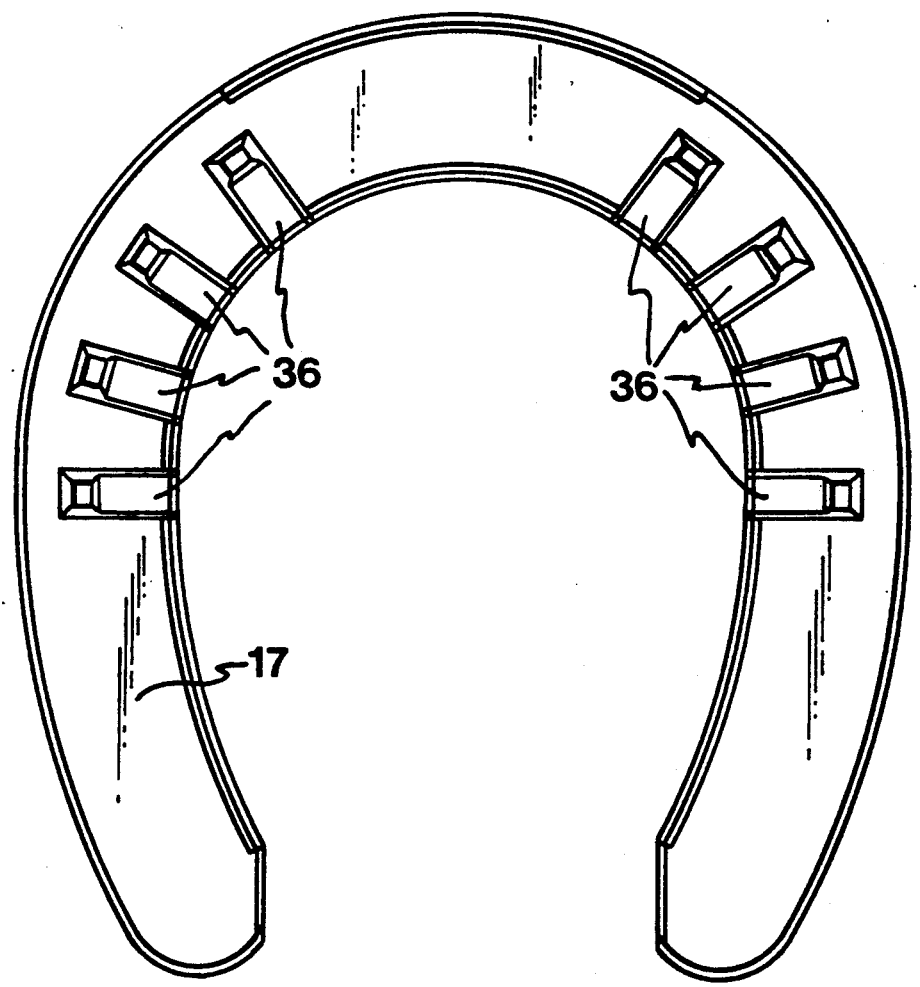

The invention will be described in greater detail below, reference being had to the accompanying drawings in which FIG. 1 is a view of the shoe as seen from underneath, FIGS. 2a and 2b are sections along line II—II in FIG. 1, with and without an attachment member as described below, FIG. 3 is a section along line III—III in FIG. 1, and shows an alternative to the embodiment shown in FIGS. 2a, b, FIG. 4 is a lateral view of the insert and shows two alternative embodiments, FIG. 5 is a lateral view of a heel calk attached to the shoe, FIG. 6 is a cross-sectional view along line VI—VI in FIG. 1 and shows an alternative embodiment of the insert, FIG. 7 is the same view as in FIGS. 2a and 2b and shows an alternative to the embodiment shown in these Figures, FIG. 8 shows a further alternative embodiment of the horseshoe according to the invention as seen from the side facing the ground, FIG. 9 shows the same embodiment as FIG. 8 as seen from the side facing the hoof, FIG. 10 is a cross-sectional view taken along line X—X in FIG. 9, FIG. 11 is a cross-sectional view taken along line XI—XI in FIG. 9, FIG. 12 is a cross-sectional view taken along line XII—XII in FIG. 9, FIG. 13 is a cross-sectional view taken along line XIII—XIII in FIG. 9, FIG. 14 shows an embodiment of a toe cap or side cap, and FIG. 15 is a longitudinal section taken along line XV—XV in FIG. 9.

FIG. 1 shows that the lower side of a substantially U-shaped horseshoe 1 comprises two sets of six rectangular holes 2, 3 which may all be used for driving in conventional horseshoe nails. The outermost holes 3 of each set are, however, primarily intended to receive different attachment members 4, 5 to adapt the shoe to different substrates. Such attachment members 4, 5 are mounted by inserting pins arranged on the attachment members 4, 5 into corresponding rectangular nail holes 3 and by gluing to the wearing surface 6 of the shoe. The wearing surface 6 may be provided with sipes 7 or other pattern to increase the grip on slippery substrates. To this end, the wearing surface may further be provided with studs 8 between the nail holes.

FIGS. 2a and 2b are cross-sectional views of the shoe with a plastically ductile insert 16. FIG. 2a is a stepped cross-sectional view of one embodiment with no toe calk attached to the shoe, wherein the base of the highest step is adapted to adjoin the outer side of the hoof. FIG. 2b illustrates an embodiment of a toe calk 4 attached to the shoe 1, and shows the provision of grooves 10, 11 in the lateral surfaces 9 of the insert 16. It also appears that the grooves impart to the cross-section of the insert the approximate form of, on the one hand, an X-beam and, on the other hand, a U-beam, the two forms being superimposed such that a slightly deformed X is created. In FIG. 2a, a dashed line indicates a further groove 12 which is provided in the upper side of the insert 16 and which is intended for e.g. training shoes. Shoes for ordinary use are normally also provided with at least one toe cap 13 as shown in FIGS. 1 and 4.

Attention is here called to the position of the insert 16 in the lateral direction of the shoe. The insert must be positioned along the line in the hoof where the horse has no sense of feeling, the so-called white line. At the front of the hoof, this line extends closer to the outer wall than at the rear of the hoof (compare FIGS. 2a, 2b with FIG. 3), and the insert must be positioned correspondingly since it would cause acute pain and even injury to the horse if the nails were driven in beside the white line.

FIG. 3 illustrates what has been said in connection with FIGS. 2a, b, viz. that the insert is equidistantly spaced from the two lateral surfaces 40 of the shoe.

FIG. 4 is a lateral view of the insert, and shows two alternative embodiments, one of which is marked with a dash-dot line. In the other embodiment, the lower surface 14 of the insert 16 is provided with indentations 15 so as to increase the surface area thereof and give the surface an irregular shape for the reasons indicated below.

A portion 17 enclosing the insert 16 as shown in FIGS. 2a, b and 3 is made of elastic material, preferably a rubber type elastomer, which has been vulcanised to the insert. Since it is most important to obtain a lasting connection between the elastomer and the insert, the insert 16 is provided with the said indentations 15 so that, regardless of where the load is applied, the enclosing portion 17, by being attached to an irregular surface, may absorb the load in the best possible way.

FIG. 6 shows a further alternative embodiment of the insert which here has substantially the same cross-section as before, except that it is smaller and is provided with at least one open or closed cavity or channel 30 extending in the longitudinal direction of the insert. Furthermore, the design of the front end of the insert has been slightly modified. If the channel 30 is open, it opens toward the hoof, and in the area of the opening the material enclosing the insert is transmissive to, for example, ultraviolet light. If the channel is closed, and if it is not transmissive to ultraviolet light, use is made of e.g. microwave radiation to achieve the same purpose, viz. curing (see below). A separate element of a curable composite type material is applied to the channel. A reinforcement comprising, for example, aramide fibres, glass fibres, carbon fibres or acrylic fibres is part of the composite material. The material enclosing the reinforcement comprises, for example, an acrylic compound, epoxy resin, acrylic gel or urethane resin and may have components which, for example, make it thermosetting or curable by ultraviolet light. Curing can also be carried out in some other manner, for example by adding some type of hardener to the material in the channel. The hardener can be distributed in different ways. Already in connection with the manufacture of the insert, e.g. thin hardener capsules can be positioned in the resin and, on adjustment of the shoe, be deformed, burst, collapse, and be emptied. It is also possible to introduce, by means of a syringe, a suitable hardener via a perforated tube which extends along the entire shoe and which has been inserted previously or is inserted only temporarily. By such a design of the insert, the shoe may first be readily adjusted and then, after curing, become rigid such that the desired shape is preserved.

The insert may be made of an elastically deformable plastics material which has been integrated with a slightly more rigid, plastically ductile part of metal extending in the longitudinal direction of the insert as shown in FIG. 7. The insert may have integrated therein an inner portion of another and more rigid material, of a thick steel wire or a plastics material which is rigid at the temperature of use ($-30°$ C. to $+70°$ C.) but ductile at higher temperatures (above $70°$ C.).

In the embodiment shown in FIGS. 8–15, the curable composite material is positioned as a separate element 32 in a cavity 31 directly in the portion 17. The cavity 31 is upwardly open and is, on each side, provided with a flange 35 which helps to keep the composite material in the cavity. An adhesive tape (not shown) is applied to the horseshoe surface adapted to face the hoof and covers the entire surface in order to further fix the composite material in the shoe and to serve as a seal.

FIGS. 10–12 are cross-sectional views of the shoe. The lower, inner edge of the shoe is bevelled in a stepped manner, and the inner boundary surface is inclined so that the shoe tapers downwards, thereby making dirt come off more readily from the hoof and increasing the grip on the substrate. Within a limited angle portion of the shoe front part, also the lower, outer edge is bevelled in a stepped manner. This is best seen in FIG. 10. The main purpose of this bevelling is to make the pace of the horse smoother.

Opposite the nail holes 2, the shoe inner portion is thinner than its outer portion, as appears from FIGS. 8 and 12, thereby forming a depression 36 inside the nail hole. The depressions impart to the horse an increased grip on the substrate and permit inspection whether the nail is correctly positioned when attaching the shoe to the hoof. Also the depressions 36 have inclined boundary surfaces to make dirt come off more readily.

Reference is now made to FIGS. 13 and 14. The shoe can be provided with optionally positionable toe caps and side caps 37. An embodiment of a toe cap or side cap is illustrated in FIG. 14. It comprises, in addition to the actual protective plate 38, a stem 39 with a hook 40. In the positions where the two caps and the side caps are adapted to be mounted, a recess 41 is formed in the portion 17 above the insert 16 and extends to the shoe outer edge. The recess also extends downwards behind the insert 16. In this recess 41, the stem 39 and the hook 40 are positioned. First the protective plate 38 and the stem 39 are in alignment with one another, but after attaching the shoe to the hoof, the plate 38 is bent upwards into engagement with the hoof as is shown in FIG. 13. When the shoe is attached to the hoof, the toe cap or the side cap thus is clamped between the hoof and the shoe and cannot come loose.

In the embodiment shown in FIG. 9, there are five recesses 41 for positioning one toe cap and four side caps. The shoe can however be formed with further recesses 41 for mounting additional toe caps and side caps. Even if recesses are provided, they need not be used. Of course, the shoe can also be designed without recesses and be used without toe caps and side caps.

As is shown in FIGS. 10–13, the insert 16 is embedded in the portion 17 and is formed with a groove 34 in the upper side, said groove being filled with the elastic material of the portion 17, thereby improving the adhesion between the insert 16 and the portion 17. In some embodiments, the hook 40 extends downwards into the groove 34, instead of into a recess behind the insert 16.

The portion 17 may be made of a thermoplastic compound which is a polyurethane elastomer having the tradename "Elastollan 1185 A" supplied by BASF. This elastomer is transparent so as to let the UV light pass.

The insert 16 may be made of aluminum or an aluminum alloy (corresponding to the British Standard H9-TF or DIN-AlMgSi 0.5-F22).

The composite material may be a vinyl ester resin (unsaturated polyester plastic) with the tradename "Palatal", designated A 430 I, supplied by BASF and having 50% glass fiber roving.

By this design, the shoe may first be readily adjusted while the insert is keeping up the strength of the shoe, and then, after curing of the composite material to make it hard and strong, become rigid such that the desired shape is preserved.

The horseshoe according to the invention is intended for use both on very hard asphalt and cement substrates and on soft, perhaps even muddy tracks. To this end, the shoe is furnished with facilities to receive different attachment members, such as the toe calk 4 shown in FIG. 2b, which is intended mainly for gallopers, but also heel calks 5 of the type as shown in FIG. 5. These attachment members are adapted to be glued to the wearing surface 6 of the shoe 1 and, as mentioned above, to be mounted also in one or more of the nail holes 3. Attachment members 4, 5 of this type are intended to be worn down fairly quickly, which means that if, for example, a horse is reshod just before a race and if, at the same time, one or more of the attachment members here shown are mounted alone or in combination, the horse need not be reshod after the race but can continue on the same shoes. This is advantageous in several aspects, especially from the economic point of view.

A fact which should also be mentioned is that the horseshoe according to the invention weighs about 40–70 g depending on the size, i.e. much less than the shoes now available, which also contributes to reduce the risk of injuries to the horse's joints and tendons.

What I claim and desire to secure by Letters Patent is:

1. A horseshoe (1) conformed substantially to the U-shaped sole of the hook and comprising a portion (17) of an elastic material defining a wearing surface, a second surface for disposition against said hoof, and a reinforcing insert (16) of a flexible material, wherein said insert (16) is narrower than the width of the U-shaped sole such that thrust, shock and shear loads are elastically absorbed by said portion (17) wherein said portion of an elastic material is formed with an upwardly open cavity (31) which extends in the longitudinal direction of said portion (17) and which opens into said second surface and in which a separate element (32) of a curable composite material is positioned, said composite material being caused to cure in situ only after said insert has been given its final shape.

2. A horseshoe as claimed in claim 1, wherein said insert is made partly of a pure or alloyed soft metal.

3. A horseshoe as claimed in claim 2, wherein said insert is made of aluminum or an alloy thereof.

4. A horseshoe as claimed in claim 1, wherein said portion (17) is made of a thermoplastic compound.

5. A horseshoe as claimed in claim 4, wherein the thermoplastic compound is a polyurethane elastomer.

6. A horseshoe as claimed in claim 1, wherein the curable composite material is reinforced with a glass fiber roving or other fibers.

* * * * *